United States Patent [19]
Ravitz

[11] 3,864,092

[45] Feb. 4, 1975

[54] PRESSED METAL SCRAP BLOCK AND METHOD OF RECOVERING SCRAP METAL

[75] Inventor: Benjamin D. Ravitz, Pontiac, Mich.

[73] Assignee: Harold D. Lipsitz, Royal Oak, Mich.; a part interest

[22] Filed: Apr. 19, 1973

[21] Appl. No.: 352,545

Related U.S. Application Data

[63] Continuation of Ser. No. 162,196, July 13, 1971, abandoned.

[52] U.S. Cl. .................... 29/186, 29/403, 75/44 S, 264/122, 161/7
[51] Int. Cl. ............................................ B21c 37/00
[58] Field of Search .................. 161/7; 75/44 S, 53; 52/659; 29/403; 264/111, 122; 100/3, 35

[56] References Cited
UNITED STATES PATENTS

| | | | |
|---|---|---|---|
| 1,318,584 | 10/1919 | Peirce | 52/659 |
| 1,633,219 | 6/1927 | Martin | 52/659 |
| 3,629,929 | 12/1971 | Wessel | 29/403 |
| 3,674,444 | 7/1972 | Otani | 29/403 |
| 3,685,244 | 8/1972 | Palmer | 29/403 |
| 3,733,675 | 5/1973 | Diederich | 29/403 |

*Primary Examiner*—William E. Schulz
*Attorney, Agent, or Firm*—Hauke Gifford Patalidis & Dumont

[57] ABSTRACT

Metallic scrap such as is recovered from metal turnings, borings and punchings is prepared in a pressed block form together with a selected bonding material. The block is of a configuration having at least one aperture formed and extending throughout the entire width of the block. The shape of the block is such that when the blocks are loaded in random arrangement in a furnace, the transmission of the heat of convection upwardly through the block and also the passage of molten metal downwardly through the block are facilitated.

10 Claims, 5 Drawing Figures

PATENTED FEB 4 1975

3,864,092

INVENTOR
BENJAMIN D. RAVITZ

BY Hauke, Gifford & Patalidis

ATTORNEYS

1

PRESSED METAL SCRAP BLOCK AND METHOD OF RECOVERING SCRAP METAL

CROSS REFERENCE TO RELATED APPLICATIONS

This application is a continuation of application Ser. No. 162,196, filed July 13, 1971 now abandoned.

BACKGROUND OF THE INVENTION

A problem exists in the handling of ferrous and non-ferrous metal scrap such as in manufacturing plants where the scrap is produced from a variety of machining operations. Bulk handling of the scrap, which is of non-uniform fragments and sometimes even powder form, is not practical. It has been found expedient to facilitate the handling of the scrap material and its subsequent use in metallurgical furnaces by compressing and forming the scrap into a briquette form which is generally of a solid brick or pellet shape to permit shipment and exposure to heat in a furnace without danger of premature crumbling.

The present invention is particularly applicable with repsect to the recovery of cast iron waste, although it may be employed as readily for other ferrous and non-ferrous metal scrap. The prior art discloses the procedure whereby metallic scrap and cement are combined in forming the scrap block. The two substances are mixed with water to form a thick concrete-like mix and the mix thus formed is charged into molds similar to the molds of brick forming machines and then subjected to high pressure. In this way, the mix has removed from it a large amount of the entrained air. It therefore forms a relatively high density mix with a specific gravity like that of the molten slag in the furnace, but somewhat less than that of the molten metal. The quantities of cement used as a binder for the metal scrap particles and of the metal may be varied, but sufficient cement should be incorporated to make a physically strong and well-bonded block. The resultant block should be strong enough so that it may be handled without pulverizing, powdering or chipping by conventional furnace charging equipment. One suitable type of cememt for scrap block binder is low alumina Portland cement. When the cast iron blocks are charged into the furnace, they will sink by their own gravity through the levels of the slag layer. The blocks formed are of a relatively high density, but still have a sufficiently porous structure or configuration to allow gas and water vapor to escape therefrom to avoid explosion hazard.

SUMMARY OF THE INVENTION

The present invention is directed toward a particular form and configuration of scrap iron block which combines ease of handling for storage and transport and further includes a structure which facilitates the subsequent use of the scrap in metallurgical furnaces. The blocks according to my invention may be formed under pressure with a binder such as cement. They may be cured by normal dry process or alternately cured by heating to an elevated temperature which is somewhat below the melting point of the metal incorporated in the blocks.

DETAILED DESCRIPTION OF THE INVENTION

Figure 1:
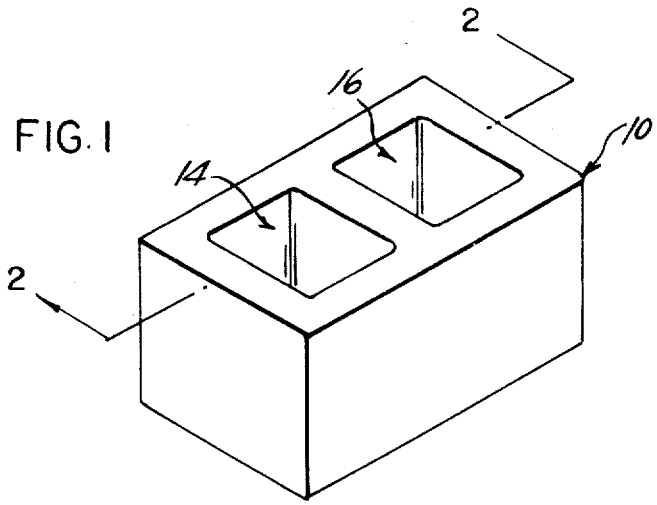
FIG. 1 is a perspective view of a scrap metal block according to my invention.

With particular reference to FIG. 1, it will be seen that the reference numeral 12 designates a scrap metal block of metallic turnings and borings, for example of cast iron, although as stated hereinbefore the present invention is applicable to all types of fragmented or particulate metal scrap, ferrous and non-ferrous, so long as it is capable of being compressed under the proper condition into blocks of the form according to my invention. The block, according to FIG. 1, is of a shape that is substantially similar to that of a cement block in which a plurality of ports or openings 14 are formed extending between the upper and lower surfaces of the block 10. It is not essential that the block itself be of rectangular shape. It is however important that there be formed one or more openings extending throughout the block. The purpose and utility of this structure will be made more clear in the explanation hereafter.

Figure 2:
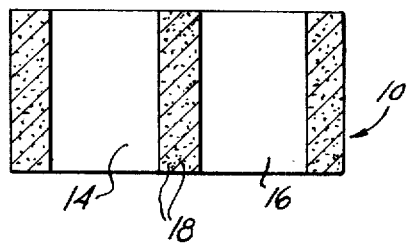
FIG. 2 is a cross-sectional view taken along the section line 2—2 of the FIG. 1 article.

FIG. 2 shows a sectional view of the block and illustrates the manner in which the particles of scrap metal are bound by the cement-type matrix into a solid block form capable of being handled and transported without breaking. It is, of course, desirable that the block shall not deteriorate in the furnace into small particles, since the small particles are largely lost during firing and tend to go upwardly through the stack as gas or as fly-ash. Block 10 is of a shape such as to confine the scrap into one mass until the block passes down through the slag and reaches the lower level of the melt zone, at which time the entire block will rapidly become molten in form. The conversion of the block into molten form in a metallurgical furnace is facilitated first by the convection heating upwardly through the apertures 14 and 16 and subsequently, as the block sinks into the lower level of the melt zone, conversion into molten form is much more rapid because the molten metal penetrates throughout the opening provided. The disintegration of the block is accelerated. The metal particles thus remain encased in the bonding material until they are released directly into the molten metal. Thus, the metal particles are prevented from oxidizing during the heating-up period. They are released out of contact with the atmosphere and below the surface of the overlying mass of slag.

In the FIG. 2 drawing, the bonding material or matrix, indicated by the numeral 18, is of cement and serves to hold the greater mass of intermingled metallic scrap particles in place in the block form indicated.

Figure 3:
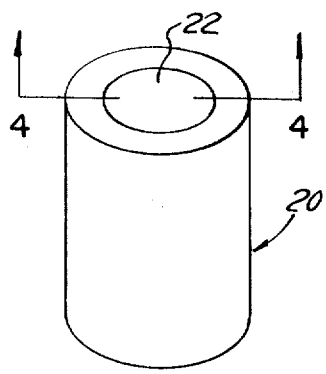
FIG. 3 is a perspective view of an alternate form of my invention.

FIG. 3 illustrates an alternate embodiment in which the block 20 is of a cylindrical form and has extending through it, from end to end, an opening 22. This form of the block is one which is capable of being rapidly molded or passed through a suitable extrusion die and cut off in any desired length. This permits ready fabrication and selective sizing with respect to the furnace and the proportion in which the scrap blocks are to be used. The cylindrical block 20 may also be modified by changing its opening size or configuration, again according to the melting characteristics of the metal scrap to be used.

Figure 4:
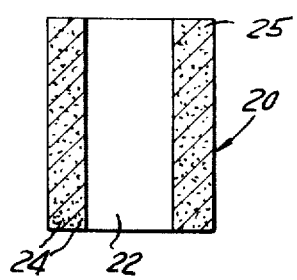
FIG. 4 is a cross-sectional view of the FIG. 3 article along the section line 4—4.

FIG. 4 further illustrates the construction of the block 20 with the port 22 of regular cross-sectional size therethrough. The matrix or binder is indicated by the numeral 24 as it is incorporated throughout the scrap metal 25 which forms the major porportion of the block 20.

Figure 5:
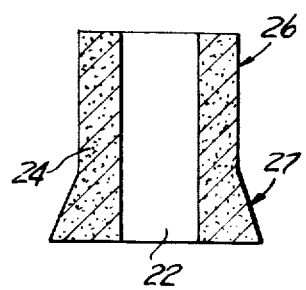
FIG. 5 is a cross-sectional view of an additional embodiment of my invention.

FIG. 5 shows a modified form of the cylindrical block 20 of FIG. 3. The block 26 preferably has a tapered cross-section with a relatively large portion 27 at the bottom. This lowers the center of gravity of the cylinder and tends to place the blocks 26, as they are randomly dumped into a furnace, in a somewhat vertically oriented position, thereby assisting in the upperward passage of heating air and of molten metal through the port 22.

It will be understood that the scrap iron block may also be used to incorporate in suitable quantity other materials which are required for use in the subsequent furnace operation. In this manner, chromium, boron compounds or other substances may be introduced into the scrap metal block during its fabrication.

I claim:

1. An article of manufacture for recovering metal scrap for remelting purpose comprising a block made of fragmentary pieces of scrap metal and a binder material compressed into a block under heavy pressure, said binder material consisting essentially of cement and said block including at least one opening extending therethrough from a surface thereof to an opposite surface, whereby subsequent conversion of the block to a molten state in a furnace is facilitated by heat convection and molten material circulation through said opening.

2. An article of manufacture as set forth in claim 1 wherein said block is of substantially rectangular cross section and wherein a pair of spaced openings are formed, both of said openings extending between opposite surfaces of said block.

3. The combination as set forth in claim 1 wherein said block is of substantially cylindrical configuration and wherein said opening comprises a central channel which extends between opposite plane surfaces of said block.

4. The combination as set forth in claim 3 wherein said block is of non-uniform cross section and has a relatively larger portion formed proximate one of its ends whereby its center of gravity is concentrated proximate to said end.

5. The combination as set forth in claim 1 wherein said block comprises substantially 90% of scrap metal and 10% of binder material.

6. A method for recovering metal scrap for remelting purpose, said method comprising mixing fragmentary pieces of scrap metal with cement, compacting said fragmentary pieces of scrap metal and cement into a block, and leaving at least one opening extending from surface to surface through said block for causing improved heat convection and molten material circulation through said block when said block is placed in a heated furnace for melting.

7. The method of claim 6 wherein said block is formed with a substantially rectangular cross section and wherein a pair of spaced openings are formed, both communicating between opposite surfaces of said block.

8. The method of claim 6 wherein said block is formed with a substantially cylindrical configuration and wherein said opening is a central channel which extends between opposite plane surfaces of said block.

9. The method of claim 8 wherein said block is formed with a non-uniform cross section and with a relatively larger portion proximate one of its ends whereby its center of gravity is concentrated proximate to said end.

10. The method of claim 6 wherein substantially 90% of scrap metal is mixed with 10% of binder material.

* * * * *